Feb. 10, 1953      F. R. LOETSCHER      2,628,144
LAMINATE CONSTRUCTION MATERIAL
Filed Jan. 5, 1949      2 SHEETS—SHEET 2
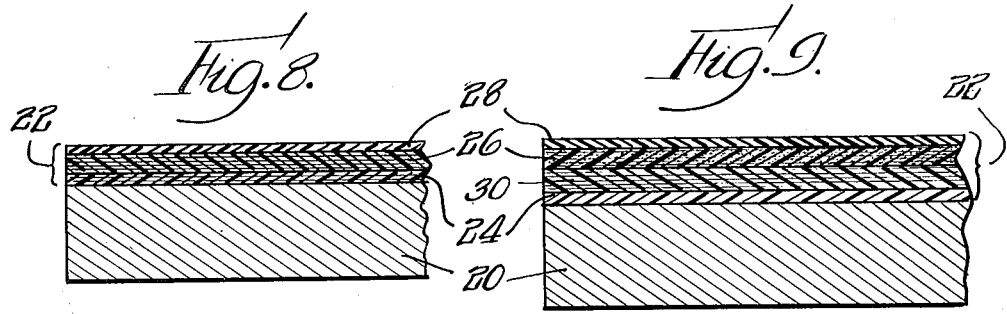
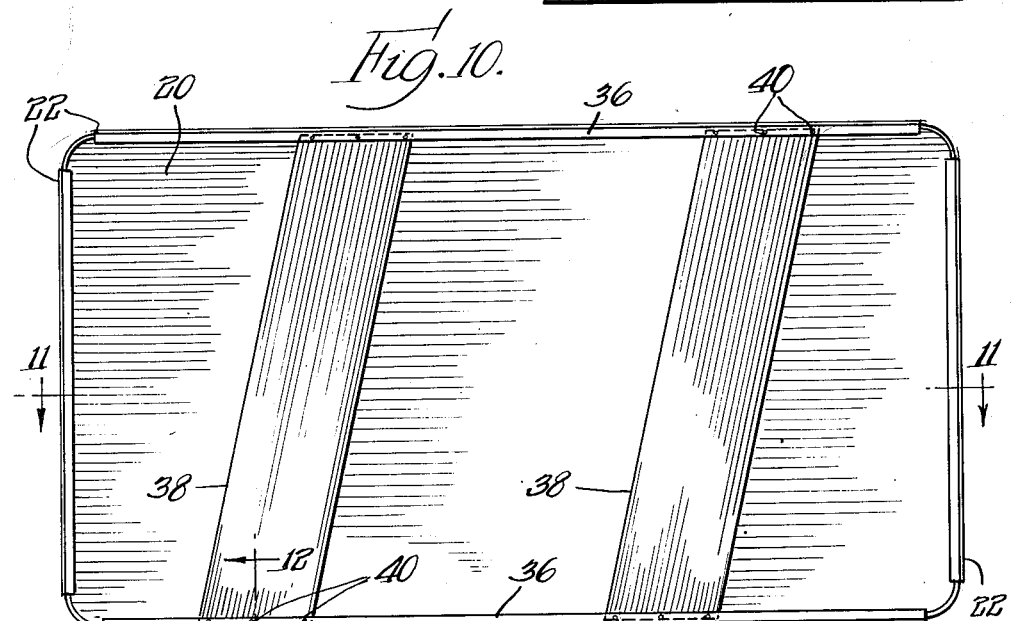
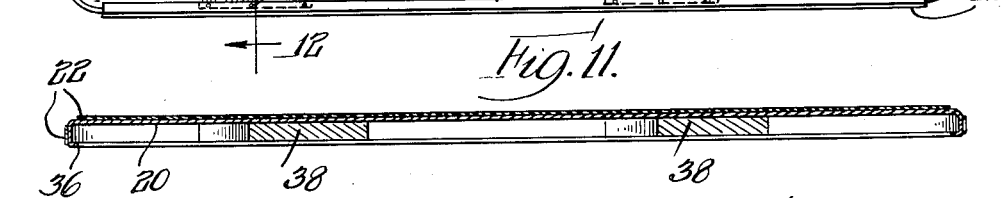
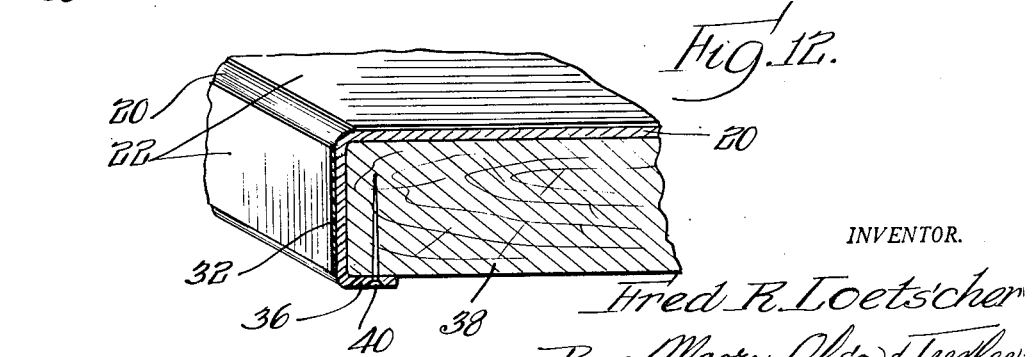
INVENTOR.
Fred R. Loetscher
By: Moore, Olson & Trexler Patented Feb. 10, 1953

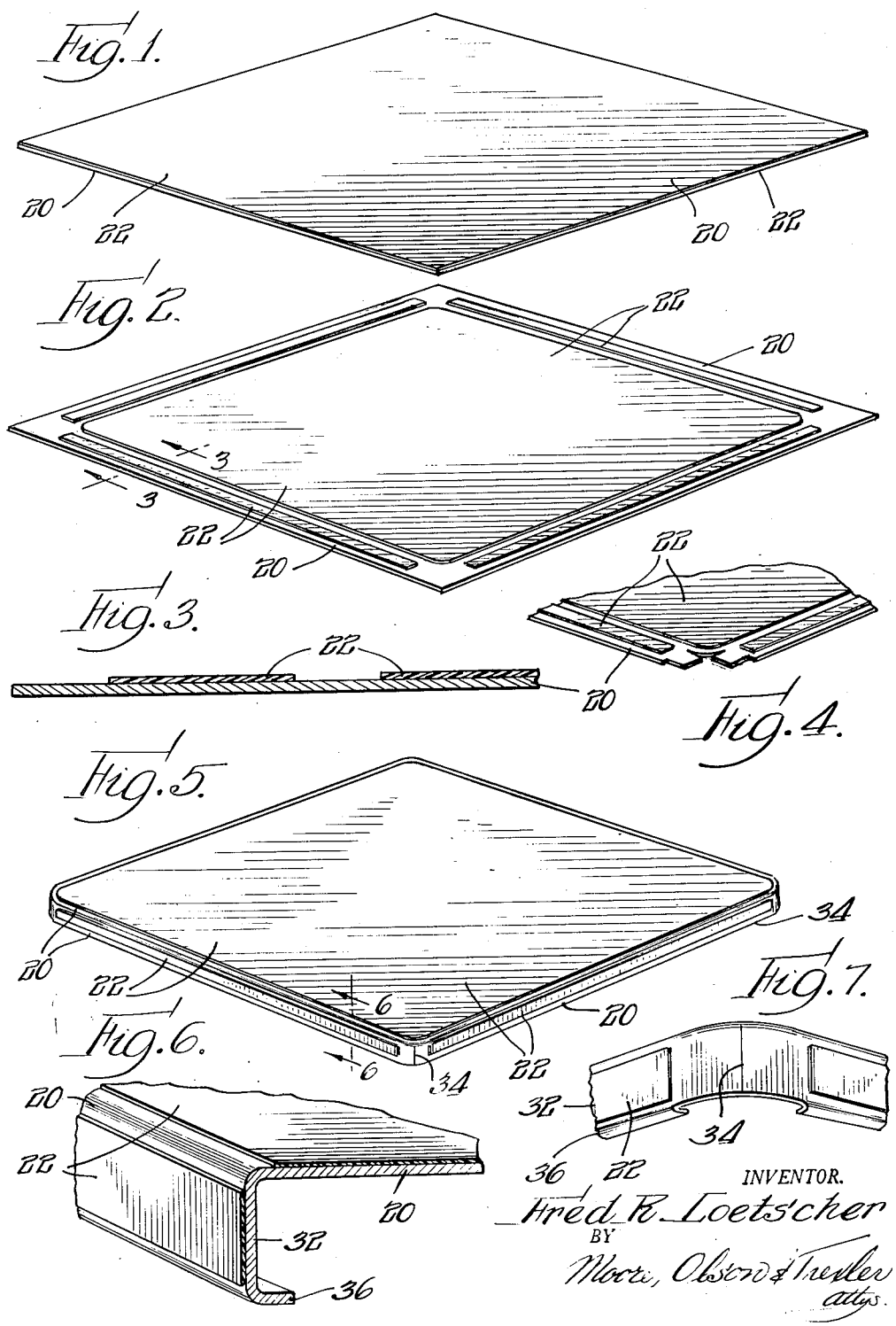

2,628,144

UNITED STATES PATENT OFFICE 2,628,144

LAMINATE CONSTRUCTION MATERIAL

Fred R. Loetscher, Dubuque, Iowa, assignor to Farley & Loetscher Mfg. Co., Dubuque, Iowa, a corporation of Iowa Application January 5, 1949, Serial No. 69,264

1 Claim. (Cl. 311—106)

This invention relates to a laminate furniture construction material, and more particularly to table tops and a method for forming table tops made of a construction material formed by bonding a sheet material filled laminate to a metal base.

An object of this invention is to produce a laminate furniture construction material composed of a sheet metal base and a fibrous material filled plastic laminate bonded to the sheet metal base.

An object of this invention is to provide a procedure of manufacture whereby articles having sharp corners and curved surfaces can be made from the above laminate construction material.

Another object of this invention is to produce a table top constructed of the above described laminate construction material which is light weight, decorative and economical in construction.

Another object of the present invention is to provide a metal table top with a skirt or flange which has a decorative design bonded firmly to the top and skirt of said table top.

It has been found that the foregoing objects are accomplished by securely fastening a plastic laminate body over its entire area to a flat sheet metal base to form a laminate construction material. It has further been found that articles having sharp edges and curved portions can be made from flat sheets of this construction material by first removing the plastic laminate from the portions of the metal base which are to be curved or bent, leaving the edges of the remaining laminate smooth and firmly attached to the metal base and then bending or curving the metal base in the desired manner. This procedure is particularly adapted to making articles such as table tops and the like which have plastic laminate on surfaces which are at an angle with each other.

In order that the invention may be better understood, reference is made to the accompanying drawings which form a part of this specification, and in which:

Figure 1 is a perspective view of a sheet of laminate furniture construction material as made by the present invention;

Figure 2 is a perspective view of a sheet of laminate construction material with part of the laminate removed by a routing or milling operation in prepartion for bending to form a table top;

Figure 3 is a sectional view along the line 3—3 in Figure 2;

Figure 4 is a perspective view of one corner of a sheet of routed laminate construction material which has been die cut in preparation for folding to form a table top;

Figure 5 is a perspective view of a completed table top;

Figure 6 is a sectional view in perspective as seen in the direction of the arrows 6—6 in Figure 5.

Figure 7 is a perspective view from the underside of a corner of a table top made according to the present invention;

Figures 8 and 9 are enlarged sectional views of preferred types of laminate construction material as made by the present invention;

Figure 10 is a plan view of the bottom of a table top made according to the present invention showing a preferred type of bracing;

Fig. 11 is a sectional view taken along the line 11—11 of Figure 10; and

Figure 12 is a sectional view taken along the line 12—12 of Figure 10.

The sheet metal base 20 may be any suitable metal such as steel, bronze, copper, zinc, but preferably polished aluminum or stainless steel of a thickness corresponding to about 16 gauge more or less.

The decorative plastic laminate, generally designated as 22, preferably includes sheet filler material such as fibrous material or in some instances metallic foil. The fibrous sheets may be paper, which is preferred for cheapness, cloth, or any other material which is suitable. If paper is used as a filler, any of the usual absorbent papers such as kraft paper, alphacellulose paper, rag stock or the like may be used. The use of metallic foils as part of the laminate filler protects the laminate against cigarette burns. The plastic or resin employed in the laminate is preferably of the thermosetting type but the invention is not limited to this type of plastic. Suitable resins are phenol-formaldehyde resins, cresol-formaldehyde resins, melamine-formaldehyde resins, urea-formaldehyde resins, and phenol-furfural resins. The preferred resins are melamine or phenolic resins. It is to be understood that the invention is not limited to the use of these resins.

In a preferred embodiment of this invention the plastic laminate sheet is preformed and then bonded to a flat metallic base sheet. An alternative method is to build up the plastic laminate on the flat base sheet by laying sheets of paper impregnated with resin over the flat metal base which has been previously coated with an adhesive, and then subjecting the assembly while flat to elevated temperature and pressure to form the laminate at the same time that it is bonded to the metal base. The bonding of the laminate to the base sheet is most satisfactory if done while the sheet metal base is perfectly flat.

Figure 8 of the drawings shows a preferred structure of the laminate 22. A bonding sheet 24, which may have a thickness of about .005 of an inch, more or less, is placed on the bottom of the laminate next to the metal. A pattern sheet 26, with a thickness of about .010 of an inch, more or less, is placed on top of the bonding sheet 24. This pattern sheet 26 will give the finished laminate a characteristic pattern. On top of the pattern sheet 26 is placed an overlay sheet 28 which will give protection for the patern sheet 26 and will present a smooth, hard finish on the surface of the finished article. This overlay sheet will be usually of a thickness of about .003 of an inch more or less.

An additional decorative effect may be had by adding a subcolor sheet 30 below the pattern sheet 26 as shown in Figure 9. The subcolor sheet 30 will show through the pattern sheet 26, giving a very pleasing coloring effect to the pattern. The use of several layers of fibrous sheet material in the laminate offers the possibility of giving striking design, color and other features to the finished laminate construction material.

A sheet of metal foil may be substituted for one or more of the fibrous material sheets. The foil is placed directly under the decorative surface plies. Use of a metal foil in the laminate reduces the possibility of damage to the laminate from cigarette burns and the like. These various layers may be impregnated with one of the suitable resins and then preformed into a laminate by the application of heat and pressure or may be bonded directly to the metal base 20 as explained above.

The bonding sheet 24 in addition to carrying the impregnating resin mentioned above must also carry a sufficient amount of a suitable metal bonding resin to attach firmly the laminate 22 to the base 20. Any suitable adhesive such as a metal to paper and plastic bonding resin may be used. Phenolic-elastomer, phenol acetal, phenolic polyamide and polyester elastomer resins are examples of suitable resins which may be cured at elevated temperatures. Vinyl acetate, vinyl acetal and butadiene-acrylonitrile rubber resins are examples of suitable bonding resins which are solvent released or fused by heating. The laminate 22 may be bonded to the base 20 under heat and pressure or by the application of pressure alone. Of course any other suitable adhesive may be used.

A preferred procedure for making laminate construction material according to the present invention is as follows. The various sheets of laminate filler paper are preimpregnated with a thermosetting resin composition, preferably a resin composition including melamine or phenolic resins. The paper is impregnated with the resin by passing the paper through a bath containing the resin dissolved in a volatile solvent. After the application of the resin composition to the paper it is preferable to dry out or evaporate a considerable portion of the volatile material in the resin composition. If it is desired to include metal foil in the laminate it is possible to obtain foil such as aluminum foil with a dry coating of thermosetting resinous material on the surface.

An example of a preferred metal base 20 is a highly polished sheet of aluminum of about 16 gauge. This sheet of aluminum must be absolutely clean, which can be accomplished by solvent degreasing to secure best results. A primer coat of resin is next applied to one surface of the metal sheet. This primer may be a solution of any of the suitable metal bonding resins. Examples are Casco Flexible Cement NT-442 and Penacolite Metal Primer MP-1. This primer coat may be applied at room temperature and is dried at room temperature or at higher temperatures such as 190–200° F. until the milky color of the primer disappears. This will require from 10 to 40 minutes depending on the particular resin and solvent used.

The preimpregnated paper sheets are assembled in the proper order on top of the prepared metal base 20 to form an assembly. This assembly is then heated under pressure to set the resin forming the final product. Preferably several of the assemblies up to ten are stacked one upon the other in a press with separator plates such as stainless steel or chrome plated smooth-surface plates between the assemblies. It is imperative to use smooth plates against the overlay sheet 28 in order to give a good smooth surface to the finished product. The press is closed on the entire stack and heat is applied for a sufficient time to cure the resin. The time required for curing, using melamine or phenolic resins is about 30 minutes. The temperature required is about 300° F. and the pressure required is about 1,000 lbs. per sq. inch. When the curing time has elapsed, the assemblies are kept under pressure and allowed to cool. Cooling under pressure is important even with thermo-setting resins in order to obtain a good smooth surface.

If preformed plastic laminate sheets are used the metal base 20 is prepared as described above. The face of the resin laminate which is to be bonded to the metal is roughened or sanded. One of the suitable metal bonding resins is applied to the sanded side of the laminate, after which the laminate is placed on the base 20 in a press and bonded to the base 20 under heat and pressure.

The finished laminate construction material will be in flat sheets and will consist of a metal base 20 which may be entirely or partly covered by the laminate 22. This laminate 22 will be firmly bonded to the metal base 20 at all points and will present a smooth, hard, glossy surface on which may be a pattern which may or may not be colored. This construction material is suitable for many applications as will be apparent to anyone skilled in the art.

It has been found that the tight bonding of the laminate to the metal and the rather hard inelastic character of the laminate 22 necessitate the use of special techniques in forming this construction material into some types of useful articles.

In table tops and like furniture it is often desirable to provide a structure such as that shown in Figure 5 in which a decorative laminate 22 is secured to the metal base 20 on both the top portion and on depending edge portions. It would be possible to produce such a structure by applying the decorative laminate to a preformed table top using a complicated set of dies or presses. Such a procedure of course would be expensive and generally unsatisfactory because of the special equipment needed and would probably give an unsuitable bond between the laminate and the base.

Applicant has devised a method of making such table tops and the like from flat pieces of the laminate furniture construction material described in the first part of this application. A flat sheet of laminate construction material such as that shown in Figure 1 may be bent and curved into the desired shape but it has been found that it is preferable to remove the laminate 22 from any portion of the metal base which is to be curved or bent. This removal of the laminate eliminates possible cracking or marring of the laminate in the areas adjacent the curves or bends and adds a decorative effect to the finished article. The laminate to be removed may be cut away by a routing or milling operation.

Figure 2 shows a sheet of laminate construction material which has had portions of the laminate 22 removed in accordance with the present invention to expose the polished metal base 20. In order to form corners on table tops and the like as shown in Figure 5 it is necessary to remove part of the metal base.

Figure 4 is a detailed drawing showing a corner of the sheet material which has had a section of the base metal 20 removed such as by die cutting in order to give smooth, rounded corners to the finished table top. After the routing and die cutting operations the edges of the sheet are bent down to provide an apron, skirt or edge 32 around the table top. The removal of the laminate along the portion which is rounded allows the forming of the edge 32 without cracking or marring the laminate 22. It is seen therefore that this invention is particularly adapted to forming table tops and the like which have decorative laminate both on the main top portion and on depending skirt portions 32 as shown in Figures 5, 6 and 7. To use this procedure of manufacture however it is necessary that the laminate be securely bonded at all points to the metal base. This type of bonding will leave all of the exposed edges of the laminate firmly sealed to the base after the removal of the laminate along the portions bent or curved.

After the bending operation the adjacent free edges at the corners of the table meet to form seams or joints 34 which are secured together in any suitable manner as by soldering. The exposed portion of the metal base 20 may be buffed and polished after the soldering operation to give the bright appearance of metal trim.

Because of the relatively light gauge of metal used in forming the table top, it is usually desirable to reinforce tables having a wide expanse. A rigidifying lip 36 may be formed on the free edge of skirt 32 to give added strength to the table top. Additional reinforcement is preferably in the form of wooden struts or supports 38 which are seated on the rigidifying lip 36. These supports 38 are preferably formed to fit the table top on the diagonal and are cut long and then driven into place to avoid the necessity for highly accurate cutting of the strut pieces 38 lengthwise. These struts or supports 38 may be held in place by nails 40 which are driven through the rigidifying lip 36 into the support 38.

Legs may be secured to the wood struts 38 underlying the table top or may be secured to a wooden skirt which can be provided under the table top.

There has been provided, therefore, a laminate construction material which is light weight, decorative and economical in construction. This laminate material may have any desired color, pattern or design and possesses a smooth, hard, glossy surface.

There has further been provided a simple, economical method of making table tops or other furniture having sharp edges or curved portions and having decorative laminate attached to surfaces which are at an angle with each other from flat sheets of laminate construction material.

Furthermore, a table top made according to the present invention will be light weight, strong, striking in design and color, durable and inexpensive in construction.

It will be apparent to those skilled in the art that many widely different embodiments of the present invention may be made without departing from the spirit or scope of this invention.

Having thus described the invention what is claimed as new and desired to be secured by Letters Patent is:

An article comprising a sheet metal base having a flat portion, a sheet filled thermosetting resin laminate bonded throughout its entire area to said flat portion, a depending edge on said flat portion, sheet filled thermosetting resin laminate bonded to said edge, and a portion of said metal base being exposed at the junction of said flat portion and said edge.

FRED R. LOETSCHER.

REFERENCES CITED

The following references are of record in the file of this patent:

UNITED STATES PATENTS

| Number | Name | Date |
|---|---|---|
| 437,384 | Schaefer | Sept. 30, 1890 |
| 871,207 | Connaty et al. | Nov. 19, 1907 |
| 1,438,698 | Debs | Dec. 12, 1922 |
| 1,826,618 | Landaw | Oct. 6, 1931 |
| 1,844,512 | Mains | Feb. 9, 1932 |
| 1,863,239 | Cochrane, Jr. | June 14, 1932 |
| 1,871,884 | Higgs | Aug. 16, 1932 |
| 1,916,435 | Ott et al. | July 4, 1933 |
| 1,929,742 | Hudlund | Oct. 10, 1933 |
| 1,946,932 | Courtney | Feb. 13, 1934 |
| 1,954,449 | Klee | Apr. 10, 1934 |
| 1,972,307 | Loetscher | Sept. 4, 1934 |
| 2,003,752 | Landt | June 4, 1935 |
| 2,011,130 | Ward | Aug. 13, 1935 |
| 2,124,060 | Gilman | July 19, 1938 |
| 2,136,180 | Cooke | Nov. 8, 1938 |
| 2,149,882 | Clements | Mar. 17, 1939 |
| 2,256,272 | Batcheller | Sept. 16, 1941 |
| 2,276,567 | Donaldson | Mar. 17, 1942 |
| 2,439,397 | Norquist | Apr. 13, 1948 |
| 2,485,644 | Norquist | Oct. 25, 1949 |
| 2,485,648 | Norquist | Oct. 25, 1949 |

FOREIGN PATENTS

| Number | Country | Date |
|---|---|---|
| 117,973 | Australia | Dec. 29, 1943 |